United States Patent

Are et al.

(10) Patent No.: US 9,085,983 B2
(45) Date of Patent: Jul. 21, 2015

(54) APPARATUS AND METHOD FOR PURGING A GAS TURBINE ROTOR

(75) Inventors: Narendra Are, Greenville, SC (US); Kenneth Moore, Greenville, SC (US); Matthew Ryan Ferslew, Johnson City, TN (US); John Clisby Blanton, Simpsonville, SC (US); Seung-Woo Choi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 591 days.

(21) Appl. No.: 13/433,829

(22) Filed: Mar. 29, 2012

(65) Prior Publication Data

US 2013/0259685 A1    Oct. 3, 2013

(51) Int. Cl.
*F01D 5/08*     (2006.01)
*F01D 25/10*   (2006.01)
*F02C 9/18*     (2006.01)

(52) U.S. Cl.
CPC ............. *F01D 5/087* (2013.01); *F01D 5/082* (2013.01); *F01D 25/10* (2013.01); *F02C 9/18* (2013.01)

(58) Field of Classification Search
CPC .......... F01D 5/043; F01D 5/048; F01D 5/08; F01D 5/081; F01D 5/082; F01D 5/087; F01D 25/10; F02C 9/18
USPC ............... 415/202; 416/1, 175, 198 R, 198 A
See application file for complete search history.

(56) References Cited

U.S. PATENT DOCUMENTS

| | | | |
|---|---|---|---|
| 3,647,313 A | 3/1972 | Koff | |
| 4,919,590 A | 4/1990 | Stratford et al. | |
| 5,163,986 A | 11/1992 | Bielefeldt | |
| 5,201,845 A | 4/1993 | Allmon et al. | |
| 5,257,903 A | 11/1993 | Allmon et al. | |
| 5,593,274 A | 1/1997 | Carreno et al. | |
| 6,338,609 B1 | 1/2002 | Decker et al. | |
| 7,000,404 B2 | 2/2006 | Palmisano et al. | |
| 2002/0076318 A1* | 6/2002 | Patel | 415/115 |
| 2003/0223856 A1* | 12/2003 | Yuri et al. | 415/1 |
| 2009/0067986 A1* | 3/2009 | Mignano | 415/115 |
| 2010/0178168 A1 | 7/2010 | Desai et al. | |

FOREIGN PATENT DOCUMENTS

| | | |
|---|---|---|
| EP | 0646721 | 5/1995 |
| EP | 1260673 | 7/2007 |
| EP | 1806578 | 11/2007 |

* cited by examiner

*Primary Examiner* — Edward Look
*Assistant Examiner* — Danielle M Christensen
(74) *Attorney, Agent, or Firm* — Nixon & Vanderhye P.C.

(57) ABSTRACT

A rotor wheel for a gas turbine rotor has a first side having a plurality of curved paddles separated by a plurality of curved slots and a second side having a plurality of radial paddles separated by a plurality of radial slots. A method of purging a rotor of a gas turbine includes providing a flow of compressed air between adjacent rotor wheels of the rotor in a radially downward direction on a first side of each wheel and in a radially upward direction on a second side of each wheel; passing the flow through a curved slots on the first side of each rotor wheel; and passing the flow through radial slots on the second side of each rotor wheel.

16 Claims, 5 Drawing Sheets

APPARATUS AND METHOD FOR PURGING A GAS TURBINE ROTOR

The present invention relates to apparatus and methods for purging a gas turbine rotor.

BACKGROUND OF THE INVENTION

During start-up or shut-down operation, a certain localized volume of the individual wheel experiences higher or colder temperature than the bulk of the wheel. This induces high temperature gradient resulting in high localized thermal stress along with wheel dishing, which are detriment to not only low cycle fatigue and damage tolerance capability of the wheel but also transient wheel to wheel behavior. In order to reduce temperature gradient, the unit rotor wheels require a secondary flow system to cool/heat the bulk of the wheel during transient operation.

In a gas turbine, the unit rotor during its full range of operation experiences temperatures higher than the material capability. As such, the rotor components are subject to low cycle fatigue, embrittlement and creep issues, which are detrimental to the performance of the system. The unit rotor wheels require a thermal management system to cool/heat the wheels during full range of operation.

In gas turbine engines it is typical to bleed air from the compressor(s) and to supply the bleed air to the turbine(s) of the gas turbine engine in order to carry out sealing and thermal management of the turbine(s). The bleed air must be supplied to the turbine(s) from the compressor(s) with minimum pressure loss so that it has sufficient pressure to provide cooling air and give sealing at the turbine(s).

In one bleed arrangement the bleed air is bled from the compressor(s) generally in a radially inward direction and is then supplied in a downstream direction through the center of the engine, for example through drive shafts or other suitable means, to the turbine(s). The bleed air is passed generally radially through a vortex reducer in order to ensure that there is a minimum pressure loss in the bleed air. The axial flow compressor comprises a rotor having a plurality of stages of circumferentially spaced radially outwardly extending rotor blades and a casing surrounding and spaced from the rotor and rotor blades. The rotor comprises at least two axially adjacent rotor discs defining a chamber therebetween and an air bleed integral with the rotor arranged to bleed a portion of air from the compressor and supply it radially inwardly to the chamber. The two axially adjacent rotor discs have opposed radially extending surfaces, at least one of the opposed radially extending surfaces is contoured to direct the bleed air radially inwardly to prevent the formation of a free vortex within the chamber and thereby reduce pressure losses in the bleed air flowing through the chamber.

The contouring of at least one of the radially extending surfaces may comprise a plurality of circumferentially spaced radially extending vanes. The vanes extend axially from at least one of the opposed radially extending surfaces by a substantially small proportion of the axial distance between the opposed radially extending surfaces of the adjacent rotor discs.

BRIEF DESCRIPTION OF THE INVENTION

According to one embodiment of the present invention, a rotor wheel for a gas turbine rotor comprises a first side having a plurality of curved paddles separated by a plurality of curved slots and a second side having a plurality of radial paddles separated by a plurality of radial slots. The first side is configured to be exposed to a flow of compressed air through the rotor in a radially downward direction of the rotor wheel and the second side is configured to be exposed to the flow in a radially upward direction of the rotor wheel.

According to another embodiment of the present invention, a method of purging a rotor of a gas turbine, comprises providing a flow of compressed air between adjacent rotor wheels of the rotor in a radially downward direction on a first side of each wheel and in a radially upward direction on a second side of each wheel; passing the flow through a curved slots on the first side of each rotor wheel; and passing the flow through radial slots on the second side of each rotor wheel.

DETAILED DESCRIPTION OF THE INVENTION

Figure 1:
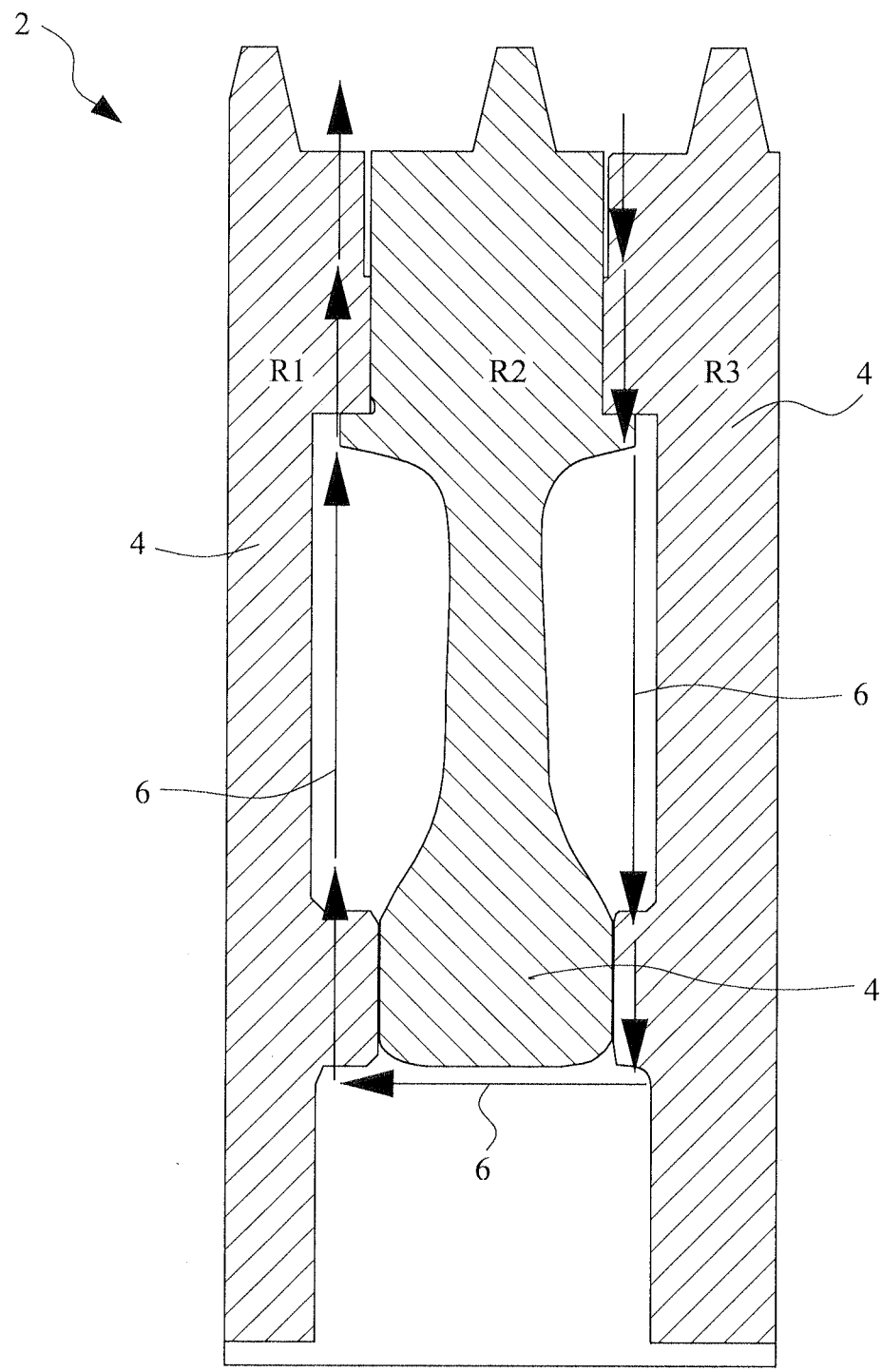
FIG. 1 is an illustration of a gas turbine rotor including a plurality of rotor wheels according to an exemplary embodiment of the present invention.
Figure 2:
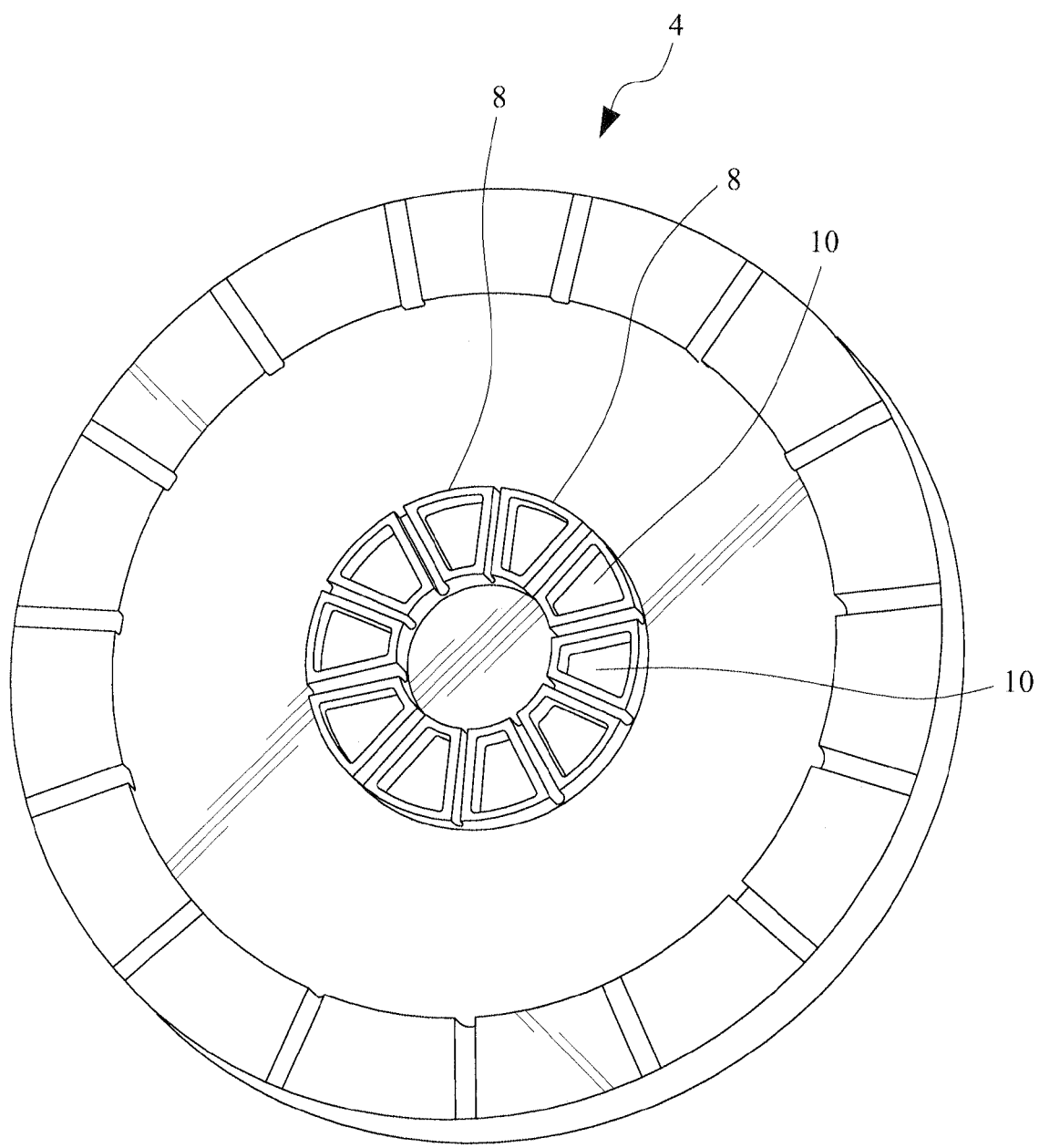
FIG. 2 is an illustration of a radially-upward-flow side of a rotor wheel according to an exemplary embodiment of the present invention.
Figure 3:
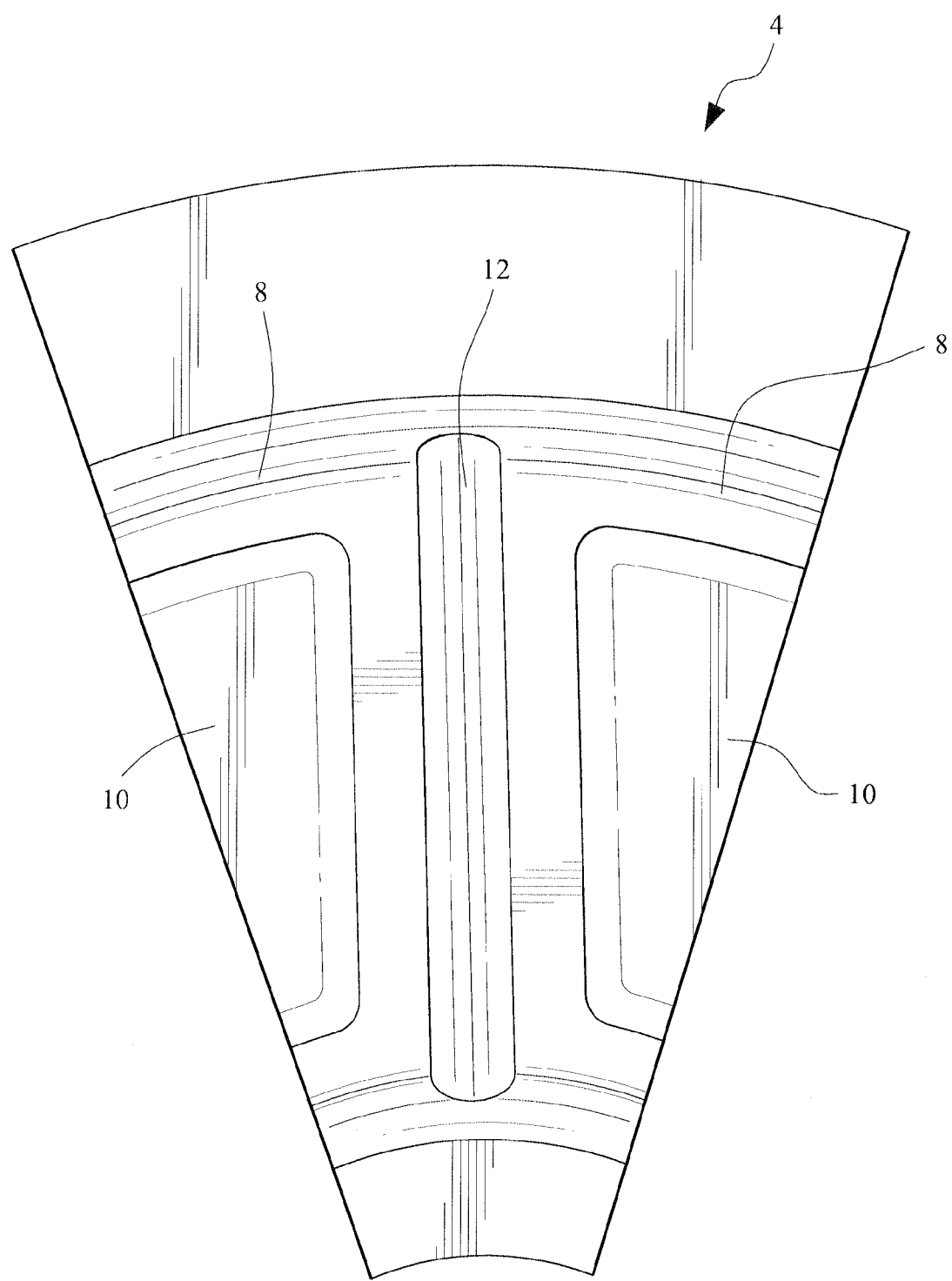
FIG. 3 is an illustration of a radial paddle of the radially-upward-flow side of the rotor wheel of FIG. 2.

Referring to FIG. 1, a gas turbine rotor 2 includes a plurality of rotor wheels 4 in axial alignment. A purge flow 6 is provided between opposing radial faces R1, R2, R3 of the rotor wheels 4. Referring to FIG. 2, the radial face R1 of the rotor wheel 4 is on a radially-upward-flow side of the rotor wheel 4 as the purge flow 6 flows radially upward or outward with respect to the bore of the rotor wheel 4. The radially-upward-flow side of the rotor wheel 4 includes radial paddles 8 that include radial slots 12 (FIG. 3) extending between the radial paddles 8.

The radial paddles 8 may include recesses 10 that may be, for example, carved or machined out of the radial paddles 8 to reduce the weight of the rotor wheels 4 and improves the wheel bores temperature response. The radial slot 12 may be formed by, for example, milling. This reduces machining costs and cycle time. The radial slot 12 also reduces pressure loss of the purge flow 6. The radial slot 12 may also be easier to form than the curved slot 18. For example, the radial slot 2 may be milled in one pass whereas the curved slot 18 may require a plurality of passes, for example 3 to 4 passes.

Figure 4:
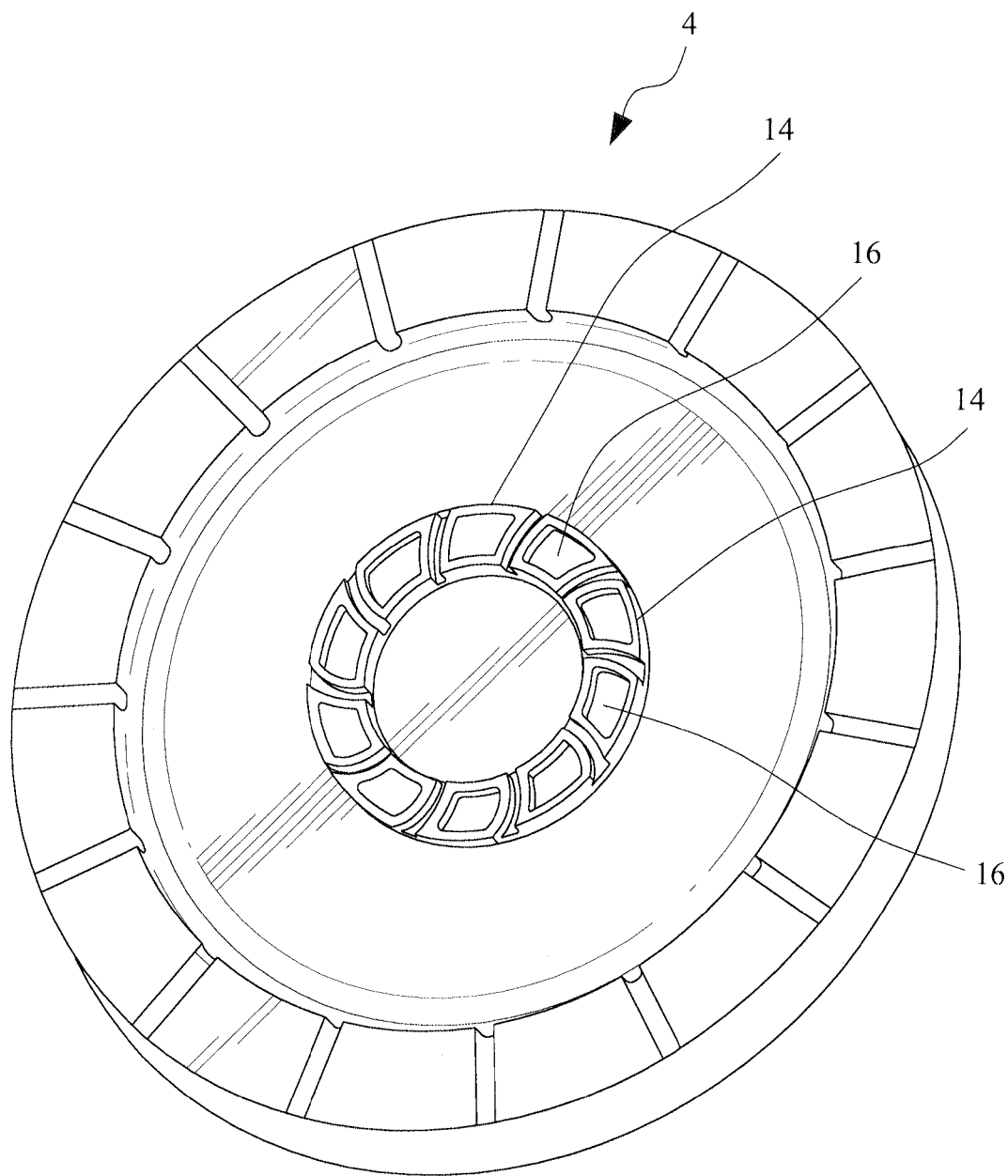
FIG. 4 is an illustration of a radially-downward-flow side of the rotor wheel according to an exemplary embodiment of the invention.
Figure 5:
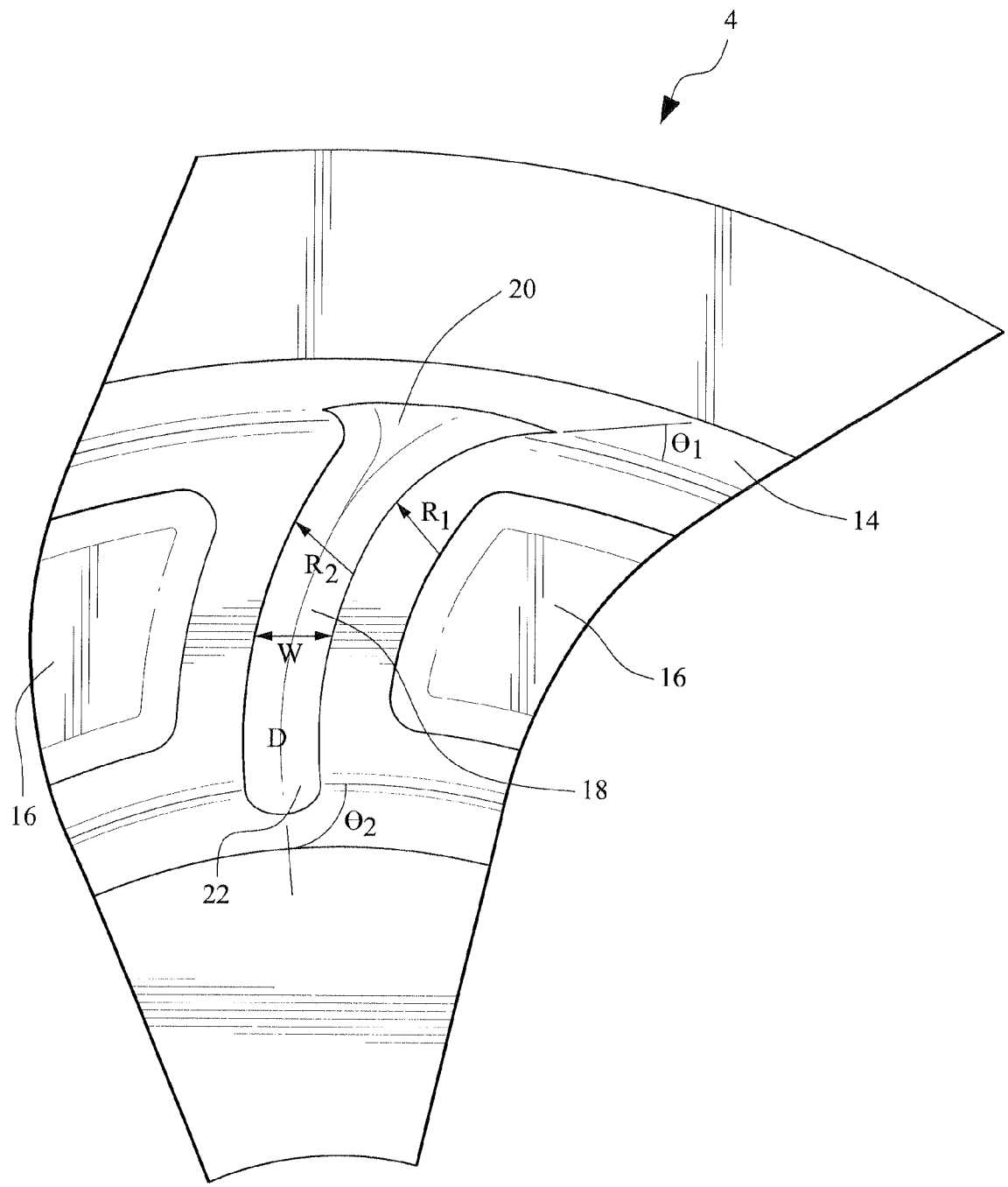
FIG. 5 is an illustration of the curved paddle of the radially-downward-flow side of the rotor wheel of FIG. 4.

Referring to FIGS. 4 and 5, a radially-downward-flow side of the rotor wheel 4, for example radial face R3, includes a plurality of curved paddles 14 that are separated by curved slots 18. The purge flow 6 is radially downward as the purge flow 6 flows radially downward or inward with respect to the bore of the rotor wheel 4. The curved paddles 14 may also include recesses 16 that may be, for example, carved or machined out of the curved paddles 14. The curved slots 18 each include a paddle entrance 20 and an angled exit 22. The curved slot has 6 design parameters, including entrance angle $\theta_1$, slot curvatures $R_1$ and $R_2$, slot width W, slot depth D, and exit angle $\theta_2$ that may be designed to minimize the entry losses of the purge flow 6 and convert the tangential velocity of the purge flow 6 into a static pressure head by creating a swirl at the paddle entrance 20. The angled exit 22 increases the flow's relative velocity at the bore of the rotor wheel 4 and increases the swirl of the flow at the bore to increase heat transfer to the wheel bores.

The rotor wheels including the curved paddles and slots on the radially-downward-flow side of the purge flow and the radial paddles and slots on the radially-upward-flow side of the purge flow improve the performance of the purge flow by converting the tangential velocity head of the purge flow into a static pressure head. The rotor wheels also improve rotor life and vibration characteristics by controlling the rotor wheel temperature through improved heat transfer to the wheel bores. The radial slots in the radially-upward-flow side reduce machining costs and cycle time while reducing the pressure loss of the purge flow. The recessed portions of the radial paddles and the curved paddles reduce the weight of the rotor wheels and improve the bore temperature response of the rotor wheels. The purge system of the rotor also improves the fast start capability of the gas turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor wheel for a gas turbine rotor, comprising:
   a first side having a plurality of curved paddles separated by a plurality of curved slots, wherein the curved slots are curved along a longitudinal axis of each of the slots; and
   a second side having a plurality of radial paddles separated by a plurality of radial slots, wherein the radial slots have a linear axis and wherein the first side is configured to be exposed to a flow of compressed air through the rotor in a radially downward direction of the rotor wheel and the second side is configured to be exposed to the flow in a radially upward direction of the rotor wheel.

2. A rotor wheel according to claim 1, wherein the plurality of curved slots each include an entrance configured to swirl the purge flow to convert a tangential velocity head of the purge flow into a static pressure head.

3. A rotor wheel according to claim 2, wherein the plurality of curved slots each include an exit at an angle to a bore region of the rotor wheel configured to swirl the purge flow and increase heat transfer to the bore region of the rotor wheel.

4. A rotor wheel according to claim 1, wherein each of the plurality of curved paddles and each of the plurality of radial paddles comprises a recess.

5. A rotor wheel according to claim 4, wherein each recess is machined.

6. A rotor wheel according to claim 5, wherein each recess is milled.

7. A rotor wheel according to claim 1, wherein each of the plurality of radial slots and each of the plurality of curved slots are machined.

8. A rotor wheel according to claim 7, wherein each of the plurality of radial slots and each of the plurality of curved slots are milled.

9. A rotor for a gas turbine comprising a plurality of rotor wheels according to claim 1.

10. A method of purging a rotor of a gas turbine, comprising:
    providing a flow of compressed air between adjacent rotor wheels of the rotor in a radially downward direction on a first side of each wheel and in a radially upward direction on a second side of each wheel;
    passing the flow through a plurality of curved slots on the first side of each rotor wheel, wherein the curved slots are curved along a longitudinal axis of each of the slots; and
    passing the flow through a plurality of radial slots on the second side of each rotor wheel, wherein the radial slots each have a linear axis.

11. A method according to claim 10, wherein passing the flow through the plurality of curved slots comprises converting a tangential velocity head of the flow at an entrance of each of the plurality of curved slots into a static pressure head.

12. A method according to claim 11, wherein converting the tangential velocity head of the flow at the entrance of each of the plurality of curved slots into a static pressure head comprises swirling the flow at the entrance to each of the plurality of curved slots.

13. A method according to claim 11, wherein passing the flow the plurality of curved slots comprises directing the flow out of the plurality of curved slots at an angle to a bore of the rotor wheel and in a direction of rotation of the rotor wheel.

14. A method according to claim 10, wherein the plurality of curved slots are provided between a plurality of curved paddles on the first side of each rotor wheel.

15. A method according to claim 14, wherein the plurality of radial slots are provided between a plurality of radial paddles on the second side of each rotor wheel.

16. A method according to claim 15, wherein each of the plurality of curved paddles and each of the plurality of radial paddles comprises a recess.

* * * * *